United States Patent [19]

Johnson

[11] Patent Number: 4,507,928

[45] Date of Patent: Apr. 2, 1985

[54] RECIPROCATING MAGNETIC REFRIGERATOR EMPLOYING TANDEM POROUS MATRICES WITHIN A RECIPROCATING DISPLACER

[75] Inventor: Dean L. Johnson, Arcadia, Calif.

[73] Assignee: The United States of America as represented by the Administrator of the National Aeronautics and Space Administration, Washington, D.C.

[21] Appl. No.: 588,164

[22] Filed: Mar. 9, 1984

[51] Int. Cl.³ .............................................. F25B 21/02
[52] U.S. Cl. ........................................................ 62/3
[58] Field of Search ............................................. 62/3

[56] References Cited

U.S. PATENT DOCUMENTS

| | | | |
|---|---|---|---|
| 2,589,775 | 3/1952 | Chilowsky | 62/1 |
| 2,913,881 | 11/1959 | Garwin | 62/3 |
| 3,108,444 | 10/1963 | Kahn | 62/3 |
| 3,119,236 | 1/1964 | Lutes | 62/3 |
| 3,413,814 | 12/1968 | van Geuns | 62/3 |
| 3,841,107 | 10/1974 | Clark | 62/3 |
| 3,884,125 | 5/1975 | Massie | 92/13.5 |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |
| 4,136,525 | 1/1979 | Van Vechten | 62/3 |
| 4,221,548 | 9/1980 | Child | 417/418 |
| 4,272,226 | 6/1981 | Osborne | 417/418 |
| 4,457,135 | 7/1984 | Hakuraku et al. | 62/3 |
| 4,459,811 | 7/1984 | Barclay et al. | 62/3 |
| 4,464,903 | 8/1984 | Nakagome et al. | 62/3 |

OTHER PUBLICATIONS

Thesis by J. R. van Geuns, "A Study of a New Magnetic Refrigerating Cycle," 1966.
C. Delpuech, et al., "Double Acting Reciprocating Magnetic Refrigerator: First Experiments," *Cryogenics*, Oct. 1981, pp. 479–584.
Paper, HB6, by A. F. Lacaze, et al., "A Gadolinium Gallium Garnet Double Acting Reciprocating Magnetic Refrigerator," presented at CEC 81, San Diego, CA, published in vol. 27, Plenum Press, pp. 703–710.

*Primary Examiner*—Lloyd L. King
*Attorney, Agent, or Firm*—Paul F. McCaul; John R. Manning; Thomas H. Jones

[57] ABSTRACT

Disclosed is a method and apparatus for a magnetic refrigeration system. A continuously reciprocating displacer houses at least a pair of paramagnetic substances each of which is alternately driven into and out of a magnetic field. Two separate bidirectional pumping systems flow helium gas through the displacer and through both paramagnetic substances to create heat exchange conditions at two separate temperature extremes.

18 Claims, 9 Drawing Figures

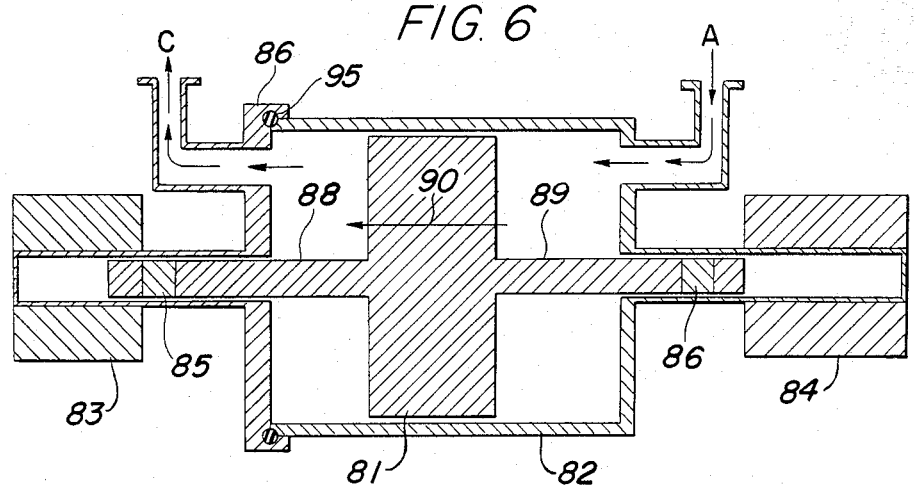
FIG. 6
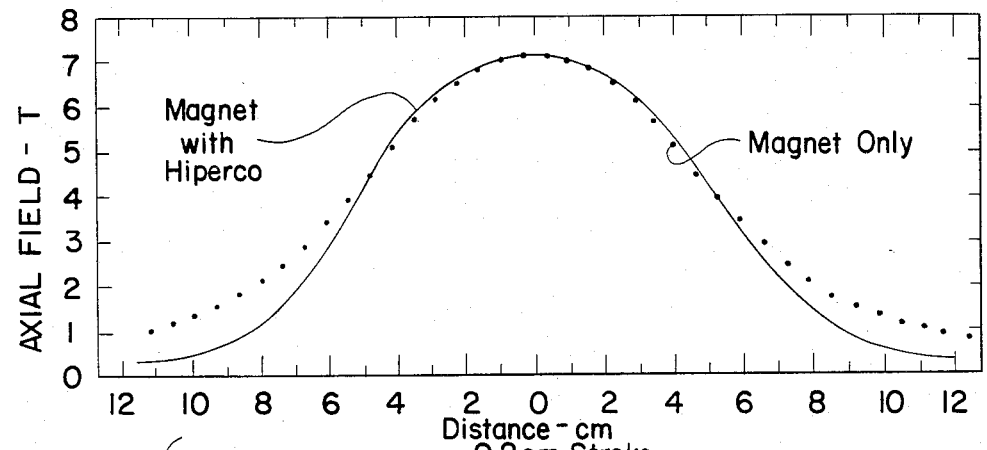
FIG. 7A
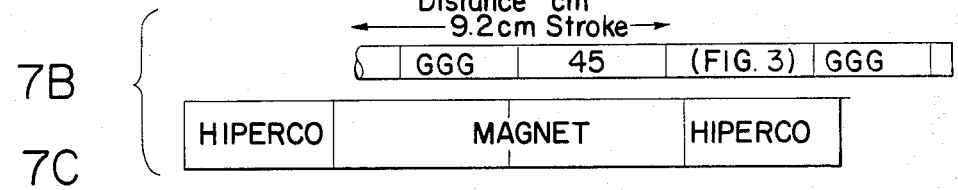
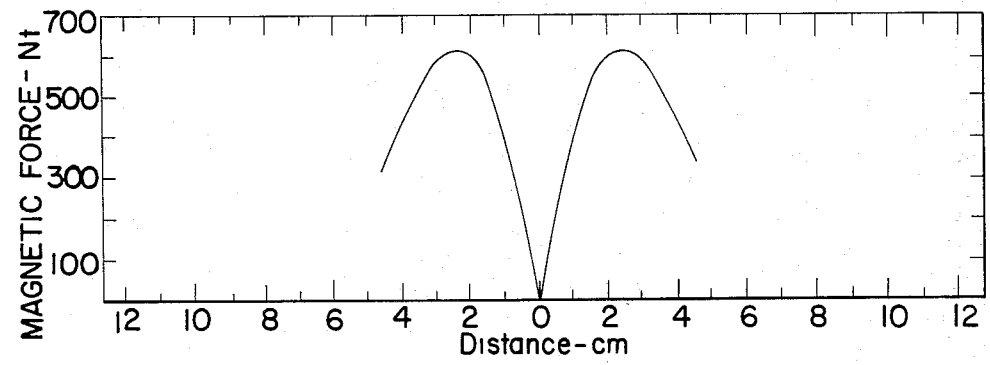

RECIPROCATING MAGNETIC REFRIGERATOR EMPLOYING TANDEM POROUS MATRICES WITHIN A RECIPROCATING DISPLACER

ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 43 USC 2457).

BACKGROUND OF THE INVENTION

FIELD OF THE INVENTION

This invention relates to a method and apparatus for a reciprocating magnetic refrigerator. More particularly, a plurality of porous matrices of paramagnetic material are located in tandem within a single reciprocating displacer. Employment of, for example, two matrices effectively doubles the heat removal capabilities per cycle of the displacer. This invention thus provides a more continuous removal of heat energy from a heat source.

At either end of the displacement stroke, one matrix is in a maximum magnetic field of a superconducting magnet, while the other matrix is in a minimum, or essentially zero, field.

The magnet is encased in a magnetically soft material which contains the magnetic flux in a localized area. Encasing the magnet in this manner allows the matrices to be spaced closer to one another and reduces the length of stroke required to move the matrices from the high magnetic field region to the low magnetic field region. The displacer is located for reciprocating movement in a cylinder which is provided with separate ports and paths. A gas pump for low temperature is connected to one set of ports, and a high temperature gas pump is connected to the other set of ports. The gas pumps cause heat exchange with the paramagnetic material by forcing helium gas through the displacer and thus the paramagnetic material matrices. As the displacer moves the matrices between the two extremes of the magnetic field the gas flow is momentarily interrupted to prevent heat exchange from occurring.

BACKGROUND DISCUSSION

Reciprocating magnetic refrigerators are well known. A typical example is depicted and disclosed in U.S. Pat. No. 3,413,814 issued Dec. 3, 1968 to J. R. van Geuns. FIG. 5 of the van Geuns patent has been reproduced herein as my prior art FIG. 1. The van Geuns patent discloses the use of paramagnetic materials shown in cross-hatching in his figures. For example, three separate disks of paramagnetic material are separated by supporting material.

As disclosed in the van Geuns patent, the entropy of a paramagnetic material in a magnetic field of predetermined strength is lower than that present in the absence of a magnetic field. This implies that in order to maintain the temperature of the system at a constant value, heat must be dissipated when the paramagnetic material is subject to magnetization, and conversely heat must be supplied to the paramagnetic material when the magnetic field disappears.

In the van Geuns patent, helium is pumped by a cylinder. The helium is pumped both clockwise and counterclockwise. The magnets are alternately being either energized or de-energized.

As described in the foregoing, the magnets are energized and then de-energized while the paramagnetic material always remain fixed relative to the magnets. It is known in the prior art, however, as shown, for example, in FIG. 4 of the van Geuns patent, to move the paramagnetic material itself from the magnetic field to a position where it receives less of the magnetic field. In the case of FIG. 4 of the van Geuns prior art, the paramagnetic material is moved by a rod.

Another technique known to the prior art is depicted in FIGS. 6 and 7 of the van Geuns patent. As described at Col. 8, in explaining those figures, the helium flows in two channels which are in phase opposition. In accordance with this prior art technique, the variations in the magnetization of the paramagnetic materials in the two channels are also changed in phase opposition. The magnetic fields may be created by two separate magnets or by rotating a single magnet.

In van Geuns a single magnet, FIG. 7, rotates from one paramagnetic material to another. Assuming now, in his FIG. 7, that the paramagnetic material on the right-hand side is being magnetized, that magnetic field causes that material to warm up. Conversely, the paramagnetic material on the left-hand side is cooling down since it's out of the magnetic field. When the paramagnetic material is warming up, the cold gas flows through and takes up the heat being generated by the magnetization. Accordingly, a piston is pushed towards the left, causing the gas to be circulated clockwise through the material. The paramagnetic material on the left is being cooled down. The warm gas flows through the cooling material, thereby cooling down the gas and thus simultaneously causing the freezer to get colder.

In van Geuns' FIG. 7, the magnet is rotated such that the field, for example, is on the left-hand side and that left-hand side is being magnetized. The paramagnetic material on the right-hand side is now being demagnetized and is cooling down. The piston is moved towards the right, which causes counterclockwise flow to the system and simultaneously cools down the freezer to a lower temperature. This cycle is repeated until the desired refrigeration is achieved.

SUMMARY OF THE INVENTION

The method and apparatus disclosed in this invention operates in accordance with a novel technique wherein two hollow containers filled with porous matrices of a paramagnetic material are located in tandem as part of a single reciprocating displacer which is slidably displaceable within a surrounding cylinder. The use of two matrices effectively doubles the heat removal capabilities per each cycle of the displacer, thus providing for a more continuous removal of heat energy from a heat source. The matrices, while located on a single reciprocating displacer, are spaced apart from one another by a solid section which has a sealed groove in slidably sealing contact with the inside of the cylinder. The cylinder wall is provided with spaced ports located in two separate gas flow loops. The matrix containers are each provided with a series of apertures which allows helium to flow through the apertures and through the paramagnetic material contained within hollow spaces in the displacer. Helium gas flowing through the matrices provides a heat exchange with the matrices. This invention utilizes two separate gas pumps which are located respectively in a low temperature gas loop and in a high temperature gas loop. The design of the displacer and the gas loops accomplishes heat exchange, in accordance with this invention, without the use of any mechanical cryogenic valves.

The method of the invention provides that the spaced and coaxial paramagnetic materials are moved past a continually energized magnetic coil which is encased in a soft magnetic material to create a confined and localized field of magnetic flux. In accordance with my method, when one of the coaxial spaced matrices is out of the magnetic field location, gas flow is accomplished through a port in the cylinder surrounding the displacer, through the one of the encased paramagnetic materials located at one end of the displacer, and back to the low temperature pump. Simultaneously, in accordance with my method, gas from the warm end temperature pump flows through other ports, through the encased paramagnetic material that is then positioned in the magnetic field and back to the high temperature pump.

The above-noted simultaneous pumping operations occur at the beginning of a stroke of the displacer. At the other end of a stroke of the displacer, the paramagnetic material which previously had been in the cold flow loop has been moved into the warm flow loop, and vice versa. When this reversed condition takes place, the direction of the gas flow within the two gas loops is reversed, permitting heat exchange with the second matrix. In accordance with this invention, the removal of heat energy from the two separate matrices during each cycle provides a more continual removal of heat from the heat source and effectively doubles the efficiency per cycle of the magnetic refrigerator.

BRIEF SUMMARY OF THE DRAWINGS

FIG. 6 depicts a cross-sectional view of the helium gas pump configurations for the gas pumps of FIG. 5.

FIGS. 7A, B and C depicts curves and illustrations helpful in understanding the reduction in displacer force provided by my invention.

DETAILED DESCRIPTION OF THE DRAWINGS

Figure 1:
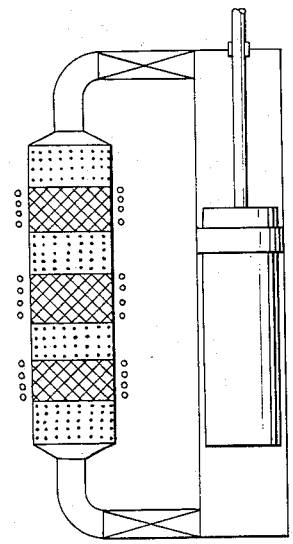
FIG. 1 is a prior art figure taken from prior art U.S. Pat. No. 3,413,814 issued Dec. 3, 1968 to J. R. van Geuns.
Figure 5:
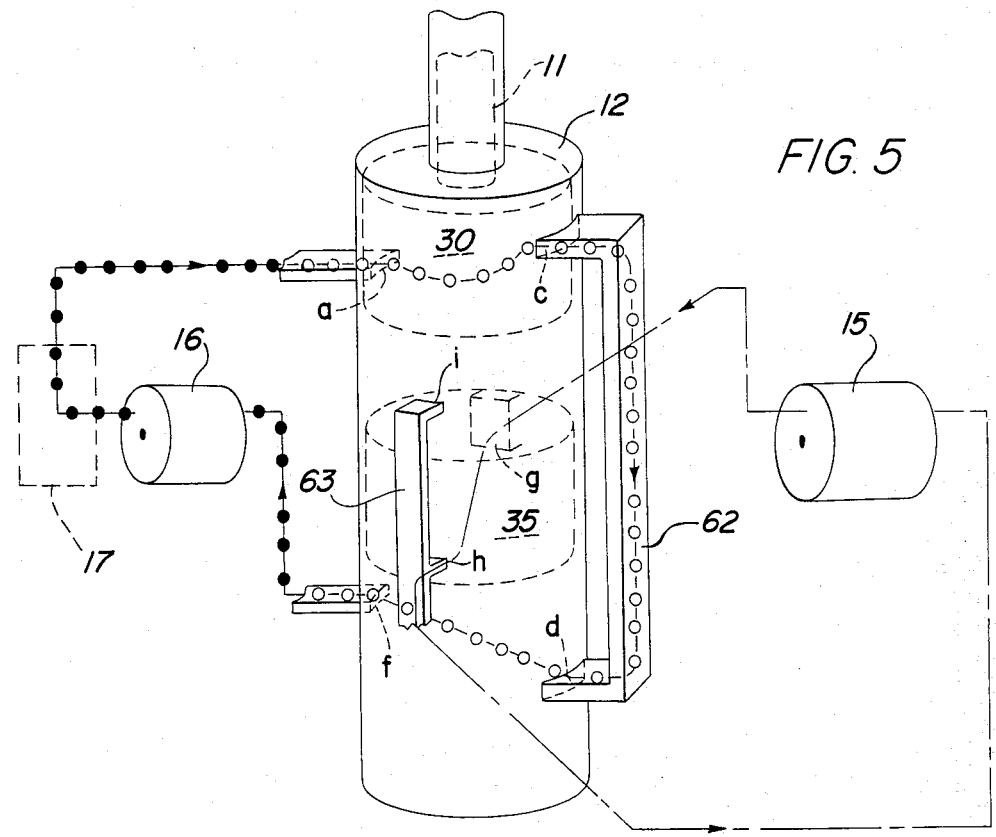
FIG. 5 is a highly illustrative configuration in perspective view which shows the gas flow loops of FIG. 4.

FIG. 1 is a prior art diagram taken from FIG. 5 of the van Geuns '814 patent referred to earlier. As shown in FIG. 1, a piston moves within a cylinder. A conventional cooler and a conventional freezer is utilized. The cooler and freezer are each in good thermal contact to the magnetic refrigerator gas loops on either side of the volume containing the paramagnetic material. Circular elements represent magnetic coils which are either energized or de-energized. The cross-hatched elements are paramagnetic. The dotted elements are gas permeable stabilizers.

Located within the closed loop of FIG. 1 is a helium gas which is pumped by the piston. In operation the cooler would be cooled, for example, to approximately 10° Kelvin (K.). At this temperature for the cooler, the freezer will ultimately acquire a temperature on the order of 3° Kelvin. The magnets, because of the arrangement in the prior art, are cooled to approximately the same temperature as that of the freezer. All of the magnets are de-energized and the piston is driven downwardly. The helium passes through the cooler and through the paramagnetic material. The helium then passes through the pipes, through the freezer and back to the intake side of the cylinder.

The gas from the warm end is pushed clockwise to the cold end, which then gets rid of the heat of the gas as it goes through the demagnetized paramagnetic material such that the gas continually gets colder whereupon the gas is able to cool the freezer as the gas passes by the freezer. Then, upon magnetization, the piston is pulled upwards, which forces the gas counterclockwise so that it will absorb the heat produced in the paramagnetic materials which have now been warmed by the magnetic field.

The paramagnetic material is kept cold by pushing the cold gas through it. The gas then will be warmer than the cooler when it finally reaches the cooler. A heat exchange dumps the heat out of the gas to the cooler. The dissipation and neutralization of the cold parts which are produced upon demagnetization of the magnetic fields ultimately ends up with a lower temperature at the freezer.

It should be noted that this prior art device suffers from several disadvantages and is clearly distinguished from the method and apparatus of my invention. For example, the piston in the prior art FIG. 1 is in a cylinder separate and apart from the paramagnetic material, whereas in my invention the paramagnetic materials are coaxially aligned, spaced apart and actually form part of the displacer itself. Additionally, the prior art magnetic fields are energized and then de-energized, contrary to my invention wherein the magnetic field remains constant. I place one paramagnetic matrix in a warmer location for gas flow and its mate paramagnetic matrix at that same time is placed in a colder gas flow. Two gas pumps in two separate gas flow paths simultaneously provide heat exchange between two different temperature extremes of my refrigerator.

Figure 2:
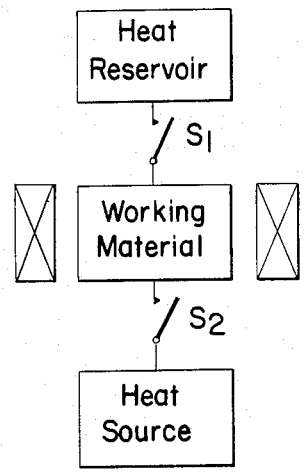
FIG. 2 is a highly simplified schematic which discloses the operational principle of any prior art magnetic refrigerator.

FIG. 2 is a highly simplified version which generically illustrates the prior art concept of cyclic magnetic refrigeration. In phase 1 of the cycle, thermal switch S2 is open and thermal switch S1 is closed so that the working material (M) is in good thermal contact with the heat reservoir (R) during the application of a magnetic field. This close proximity through closed thermal switch S1 permits the heat of magnetization normally referred to as "Q" to be of an amount equal to the temperature T times $\Delta S$, where $\Delta S$ is the change in magnetic entropy of the paramagnetic material that results from the magnetic field change.

That increase in heat is removed from the working material and thus the temperature of the material $T_M$ remains nearly constant at the reservoir temperature $T_R$. In phase 2 both thermal switches S1 and S2 are opened to thermally isolate the working material. At that point the field is reduced until $T_M$ is lowered to the heat source temperature $T_S$.

In phase 3 thermal switches S2 is closed and this permits thermal contact between the working material (M) and the heat source (S), while the final demagnetization is lowering the temperature of the working material. The heat exchange that occurs during this process establishes a somewhat lower source temperature $T_S$.

Phase 4 represents the last step in the magnetic cycle. During this phase S1 and S2 are opened to isolate the material and the magnetic field from the magnet is again increased until the temperature of the material $T_M$ is increased to the temperature of the heat reservoir $T_R$. The magnetic cycle is repeated by returning to phase 1 of the cycle and again applying the full field to the working material (M). The temperature $T_S$ will continue to fall with each cycle of the refrigerator until the net refrigeration of the working material is balanced out by heat leaks to the source.

Figure 4:
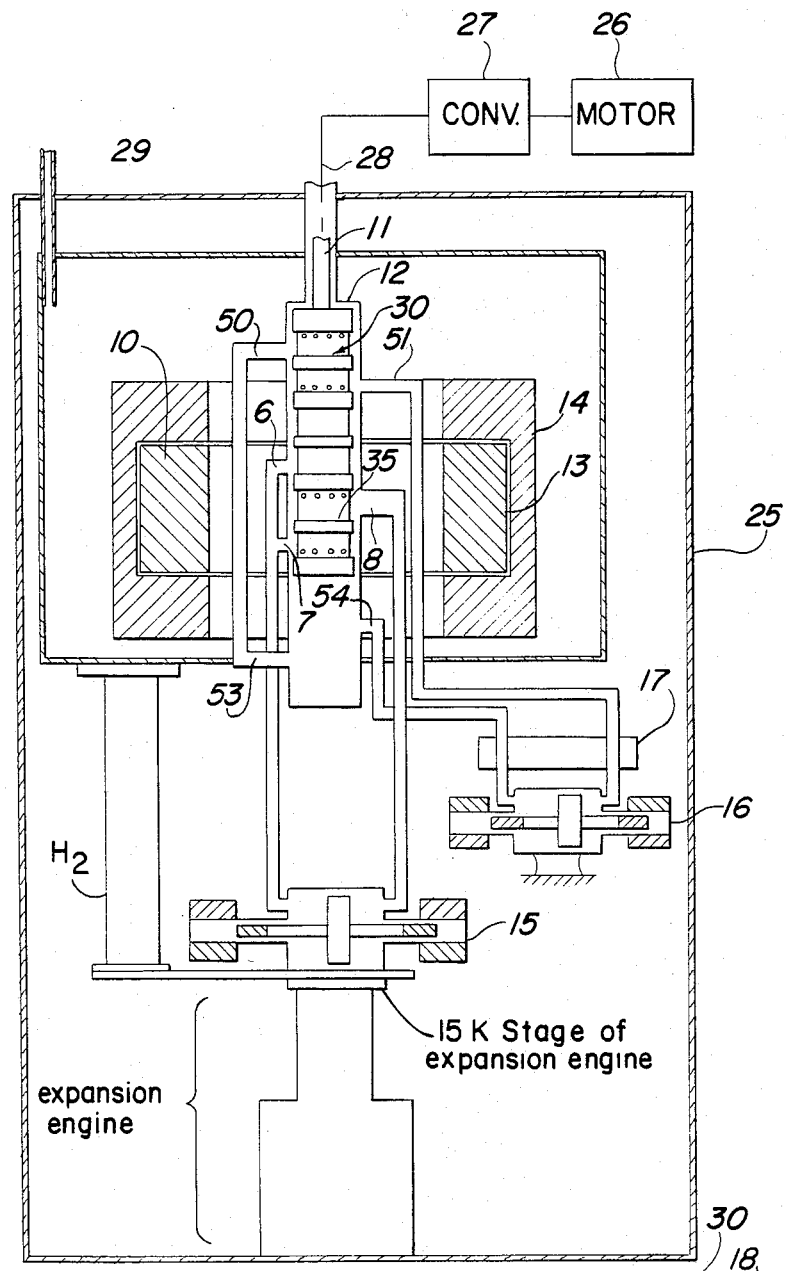
FIG. 4 depicts in simplified schematic form, the separate flow loops and the dual tandem single reciprocating displacer operating with two separate gas pumps in two separate gas loops.
Figure 3:
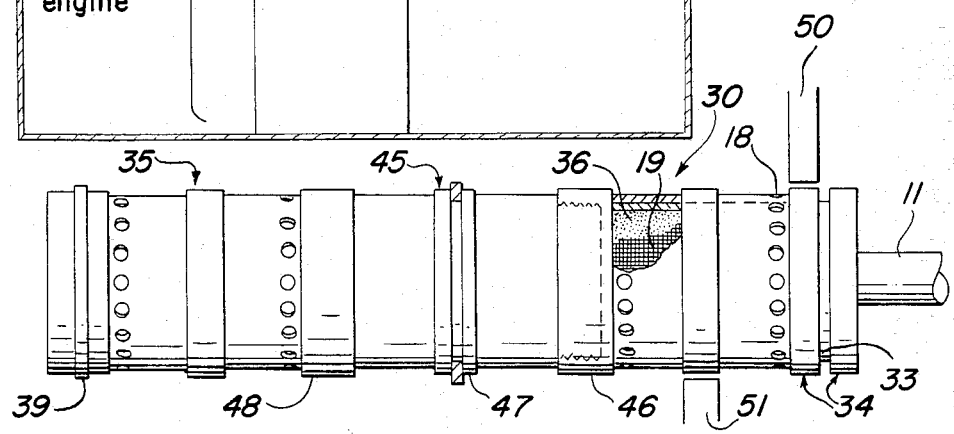
FIG. 3 depicts the housing for two matrices coaxially aligned and separated from one another to form the displacer of this invention.

Before describing the invention in operation, as depicted, for example, in FIG. 4, reference is made now to FIG. 3. FIG. 3 depicts the displacer 11 with its various grooves for seals, indents and apertures for permitting helium flow through paramagnetic material housed within hollowed-out spaces provided in displacer 11.

Displacer 11 comprises machined parts which in my preferred embodiment is machined phenolic. Two matrices generally designated 30 and 35 are separated by center solid portion 45 of displacer 11. The upper container 30 includes a thin-walled cup which is fitted with female screw threads mated to connect with the male tread portion of center 45. A seal groove 33 is machined into the top collar 34. Just below collar 34 is a first series of apertures 18. A screen or fine wire mesh 19, much smaller than the sphere size of my paramagnetic material, is employed within the thin-walled cup of matrix 30 to cover the apertures.

Located within the hollow reservoir of the cup 30 is an area which is filled with a porous paramagnetic material 36. As an example, a typical paramagnetic material is gadolinium gallium garnet which is located within matrix 30 in the hollow space as indicated by the dotted area exposed in a partially broken-away cross-section.

The center 45 of displacer 11 has a grooved middle collar 47 and threads into both the top containers. Any suitable seal may be used in the groove of middle collar 47. The solid phenolic portion aids in the temperature isolation so that the two garnet paramagnetic materials held in their porous hollow spaces at 30 and 35 are physically and thermally separated by the phenolic material.

Displacer 11 is machined to fit slidably into a stainless steel cylinder (described later). At the bottom of displacer 11, FIG. 3, is another seal 39. The seal grooves may be equipped with any suitable low temperature sealing material known in the prior art. The seals prevent the helium gas from escaping into unwanted portions of the cylinder.

Two separate gas flow paths guarantee that those paths remain isolated one from the other. The indents along the length of displacer 11 are important because these indents form part of the flow loops. Additionally, these indents allow heat exchange to occur over a period of time at the ends of the stroke such that motion of the displacer 11 need not cease during periods of gas flow. The collars (which may or may not require the low temperature seals), together with the apertures located at the extreme ends of the thin-walled cylinders in each matrix, ensures that gas will flow as desired through each of the matrices 30 and 35.

FIG. 4 depicts in schematic form the operation of the apparatus and method of my invention. In one preferred embodiment of my invention the magnetic reciprocating refrigeration provides a refrigerator system using 4 K. to 15 K. temperature extremes. I have kept the number of moving parts to a minimum and even those moving parts I assure move at slow speeds. By creating and maintaining a constant magnetic field I have saved a great deal of energy that is lost in those prior art devices which mandate creating and destroying magnetic fields. I have achieved an effective and essentially continuous heat exchange. Heat exchanges are carried out between my paramagnetic material and an object to be kept at a constant lowest temperature extreme, and between another paramagnetic matrix and a higher temperature heat reservoir which is at a second temperature extreme.

The design of my 4 K. to 15 K. magnetic refrigerator utilizes the slow speed reciprocating motion of reciprocator 11 together with a pair of helium gas pumps, which will now be described with reference to FIG. 4.

In the upper left of FIG. 4, a connection 29 leads to an external supply of 4.2 K. liquid helium. A superconducting magnet shown in cross-section as 10 is surrounding by magnetically soft material 14 shown in cross-hatched form. Magnet 10 is any conventional superconducting magnet as is well known from prior art designs, and the magnetically soft material may be chosen from a known material such as Hiperco. The magnetically soft material 14 and magnet 10 form what is known as a magnetbore. This magnetbore has a highly confined magnetic field. The magnetbore is surrounded by a Dewar as so labeled.

The bottom of the Dewar is connected to one end of an $H_2$ switch which is also well known in the prior art. The $H_2$ switch has a solidification temperature. That switch, based upon the $H_2$ solidification temperature, tends either to thermally connect or to thermally isolate the Dewar from the 15 K. stage of the refrigerator shown suitably connected at the bottom of the $H_2$ switch. It is used to initially cool the Dewar and magnet via the 15 K. refrigerator. As the Dewar and magnet are further cooled to 4.2 K. using liquid helium, the $H_2$ gas in the switch freezes out, preventing further heat transfer to occur along the $H_2$ switch.

A vacuum chamber 25 surrounds the structure shown in FIG. 4 except for drive mechanism which includes the motor 26 and a rotational-to-linear-motion converter 27. Converter 27 is connected by a drive shaft to a displacer 11 which is located within a stainless steel cylinder 12.

Displacer 11, located within steel cylinder 12, moves vertically upwardly and downwardly at a slow speed which is timed with movement of gas by the solenoid-driven gas pumps 15 and 16. The timing relationship will be described in more detail after a general description. At the position as depicted in FIG. 4, the upper matrix 30 on displacer 11 is outside of the magnetbore, whereas the lower matrix 35 is positioned in the high field region within the magnetbore. The paramagnetic material 36 in the displacer 11 which is located above the magnetbore (portion 30) will be at a lower temperature with respect to the higher temperature location at the center of the magnetbore.

Connected to the central location of cylinder 12, which is fixed in position relative to magnet 10, are pipes and ports which are also connected in a closed gas flow loop to a high temperature pump 15. This high temperature pump 15 will be described in more detail hereinafter with respect to FIG. 6. Similarly, another separate low temperature pump 16 also has associated with it a set of pipes and port entrances associated with the steel cylinder 12. The two closed gas flow loops remain isolated and separate from each other.

The high temperature gas flow loop includes a pair of centrally located ports 6 and 7 located in cylinder 12 and an opposing port 8 which is positioned in cylinder 12 opposite the location of ports 6 and 7. The low temperature loop includes at the upper portion of cylinder 12 a pair of offset ports 50, 51 and another offset pair of ports 53, 54 located at the bottom of cylinder 12.

FIG. 5 reflects in highly schematic form, displacer 11, the cylinder 12 and a perspective view of some of the conduits for the high and low temperature gas flow loops. It is assumed in FIG. 5 that the displacer 11, with the tandem paramagnetic material matrix locations 30 and 35, is roughly in the same position as is shown in FIG. 4.

The low temperature flow loop is pumped by gas pump 16. That low temperature loop is shown by a series of dots, arrows and lower case letters. The ports described earlier in conjunction with FIG. 4 are only partially shown in FIG. 5. A low temperature gas flow loop, for example, may occur in the direction of the arrows through one port at a, through volume 30 of the paramagnetic material 30, out port c through an external channel designated 62, through another port d, through the empty space in the bottom of cylinder 12, and out port f where it is returned to the helium gas pump 16.

When matrix 35 reaches the bottom of the cylinder 12 the direction of flow from pump 16 is reversed. The same gas flow as shown by arrows (now reversed) and dots is then employed, except that the top of cylinder 12 is then open and used as part of the gas flow path. In either extreme position, top or bottom, for displacer 11, however, the cold temperature loop remains the same except that its direction of gas flow is reversed.

A warm temperature helium pump 15 is, in this instance, causing gas flow through the ports described earlier in connection with FIG. 4 whereby helium gas flows through the center of the magnetbore. The warm temperature flow path is shown by dashed lines, arrows and lower case letters. The dashed lines leave pump 15 and flow through the lower portion of port g, the paramagnetic material in matrix 35, out the lower portion of channel 63 at port h where it is returned to the gas pump 15.

When the displacer 11 is at the bottom of cylinder 12 the direction of flow is reversed and the gas flow is out through top port i of tube 63 and through the top portion of port g back to pump 16. The collars of displacer 11 are spaced relative to positioning of ports h and i so that these flow loops disperse the helium gas most effectively throughout the paramagnetic material in the particular matrix centered in the magnetbore. It should be noted that the top and bottom ports a–c and f–d are similarly arranged with respect to the collars on displacer 11 as shown in FIG. 3 to assure most effective dispersal of the helium gas through the upper-positioned and lower-positioned matrix.

Operation

After the vacuum chamber 25, FIG. 4, has been evacuated, everything located within that chamber will initially be at room temperature. Located at the bottom of FIG. 4 is an expansion engine which will produce refrigeration at a nominal 15 K. as shown in FIG. 4. The 15 K. stage cools down the entire system by drawing heat out of the Dewar and the magnet through the hydrogen switch $H_2$, and out of the pipes and pumps and into the 15 K. expansion engine. Although it takes some time, all of the components, including the piston, the displacer, the cylinder, etc., will cool down to near the nominal 15 Kelvin temperature.

Around 20 Kelvin the $H_2$ switch changes state. $H_2$ switches are known in the art. An example is disclosed in U.S. Pat. No. 3,260,055 to Wiebe. When such switches reach a predetermined temperature the hydrogen gas within the $H_2$ switch turns solid. The solidified hydrogen sticks to the walls and concentric tubes located within the $H_2$ switch (not shown) and thereafter the $H_2$ switch is not allowed to create any further heat exchange by way of thermal conduction along the $H_2$ switch.

At this point in my operation, I have now removed essentially all the heat from the material. I next provide a liquid helium transfer through the pipe 29 into the Dewar to fill the Dewar. The liquid helium that is put into the Dewar is at a temperature of around 2.4 Kelvin, which cools the magnet 10 and the soft magnetic material 14 to 4.2 K. I then energize the magnet 10 by a conventional source (not shown) to magnetize it to a maximum magnetic field whereafter the power supply is removed and the magnet operates in persistent mode.

I will now describe the gas loops, the gas pumps, the indents on my displacer and why my invention operates without any cryogenic valves being required. FIG. 6 is a cross-sectional view of either of the helium gas pumps 15 or 16. The gas pump comprises a stainless steel cylindrical housing 82. Located within the housing 82 is a piston 81 which is made of machined phenolic. The piston 81 is capable of reciprocal movement in the stainless steel cylinder housing 82. At the left-hand side of the gas pump a cap 86 is sealed, with a suitable seal 95, to the cylinder 82. Cylinder 81 has extending from opposite sides thereof two centrally located drive extensions 88 and 89. At the ends of the driving cylinders 80, 89 are some samarium-cobalt rare earth magnets shown as 85 and 87. These magnets are either fastened to or are inserted in the piston's drive shaft. The piston slidably rides within an airtight sealed extension under control of the magnetic solenoids 83 and 84. Current through either coil 83 or coil 84 produces a magnetic field which repels the cobalt magnets 85 or 87 located at the end of the piston drive shafts 88, 89.

Assume that piston 81 moves, for example, toward the left, as shown by the arrow 90. That movement forces gas out port C while simultaneously drawing helium gas into port A. Reversal of the direction of the current through coils 83 and 84 will reverse the direction of motion of the piston 81, thereby reversing the direction of gas flow through ports A and C. Timing for driving the piston 81 toward the left or toward the right depends upon a synchronized condition with the movement of displacer 11. This synchronized timing may be accomplished by any means (not shown) well known in the art. The appropriate timing relationship will become obvious to anyone skilled in the art as the operation of FIG. 4 is described.

It should be noted that across the paramagnetic material 36 within my displacer 11, there will be a small pressure drop ΔP. That ΔP is the amount of pressure that is to be overcome by cylinder movement within the gas pumps. The gas pumps are in phased relationship with the position of the displacer itself. The pumps are started near the end of a displacer stroke. Gas starts flowing as soon as the indents within the displacer 11 open up the appropriate ports for the continuous gas flow loops as described.

Digressing briefly to FIG. 3, two connection tubes 50 and 51 leading to gas flow ports c and a, FIG. 5, are shown positioned at a particular location with respect to displacer 11. As depicted in FIG. 3, gas ports 50 and 51 are blocked by the collars such as collar 34, so that essentially no gas can flow through the helium flow apertures 18 in the upper container 30.

Comparison of the location of gas ports 50 and 51 of FIG. 3 with those same gas ports of FIG. 4 shows that as displacer 11 moves upward slightly, the blocking collars are moved beyond the openings of a and c in cylinder 12 and gas will flow through ports 50 and 51. Helium thus flows through apertures 18 and disperses itself through the paramagnetic material 36 in container 30. Gas flow circulates throughout the entire container 30 under control of pump 16, FIG. 4. The paramagnetic material in container 30 is cool since it is located outside of the magnetbore. Thus the gas pumped by gas pump 16 will cause the cooled gas to flow through the source 17.

Source 17, in my preferred embodiment, is an object to be cooled such as a maser. A maser requires a continuous predetermined temperature. The cool gas that is being driven by the low temperature gas pump 16 holds the maser at its constant low temperature value. The return path for part of the cold temperature gas loop is shown in FIG. 4 and includes ports 53 and 54. As depicted in FIG. 4, those lower ports are located in gas flow communication through the hollow space within cylinder 12, which hollow space is below the bottom of the displacer 11.

While the above operation is taking place, and simultaneously therewith, the higher temperature pump 15 is pumping helium gas through the container 35 which is located in the center of the magnetbore. Because of the highly localized magnetic field, the paramagnetic material within container 35 will be heated by the magnetic field and the heat within that paramagnetic material will be transferred to the helium gas as it moves through the lower connection tube 7, port h through the paramagnetic material 36, port g and through connection tube 8, where it returns to the inlet side of pump 15. The 15 K. stage acts as a heat sink to remove the heat that is present in the gas flowing in the high temperature loop.

As displacer 11 moves downwardly toward the bottom of its stroke, the formerly cold temperature matrix 36 becomes positioned in the center of the magnetbore, whereas the previously heated matrix within container 35 moves outside of the magnetic field into the colder bottom area where the magnetic field is not present. For a period of short duration in the displacement stroke for displacer 11, while the matrices are warming or cooling as they move into or out of the magnetic field, there is no gas flow permitted in either the high temperature or the low temperature loops. During this interim there will be some small heat exchange loss between the paramagnetic material and the helium that is entrained or entrapped within the matrices. It is a small loss that is present in any magnetic refrigerator system having porous matrices.

As the displacer 11 reaches the bottom of cylinder 12, the gas pumps reverse direction and cause the helium gas to flow through the now cooler paramagnetic material contained within the lower-positioned matrix in container 35. The gas flow through the colder paramagnetic material also passes through my heat source 17, and removes some of the heat from that heat source. This removal keeps the heat source 17 at the constant desired low temperature condition.

Over one cycle of the displacer moving, for example, from the top to the bottom of cylinder 12 and back up to the top of the stroke again, I have created a thermodynamic cycle which is roughly comparable to a Carnot cycle. A Carnot cycle has two isothermal legs at a lower and higher temperature and two adiabatic legs wherein the temperature of the paramagnetic material is increasing or decreasing but no heat exchange with the heat source or heat sink occurs. The two isothermal stages are the periods of time when gas flows through the paramagnetic materials at the ends of a stroke. The adiabatic stages are the periods when the matrices are being moved between the ends of the stroke and where the gas flow is prevented from occurring. One matrix is at a low magnetic field, while the other one is always in a near maximum magnetic field. At the other extreme, of course, the other one is in a zero or essentially zero magnetic field, while the opposing or mate matrix is in the high or maximum magnetic field.

At the time when the piston is centered no ports are accessible to the paramagnetic material, and thus no gas flow exchange takes place. Thus there is no heat exchange permitted during this part of a cycle. These intervals during a complete cycle roughly represent the two isentropic legs of a thermodynamic Carnot cycle.

Reference by those of ordinary skill in the art may be made to a thesis article entitled "A Study of a New Magnetic Refrigerating Cycle" by the J. R. van Geuns who is believed to be the same individual named in the prior art patent discussed earlier in my patent application. This thesis, published in June 1966, supplies the basic theory and description of isothermal and adiabatic legs of an idealized Carnot cycle, as applied with respect to a magnetic refrigerator. It is thus well known and need not be repeated here in detail.

In lay terms, however, what has been described above is a manner of transferring heat from a heat source such as maser 17 in an essentially continuous cycle. That heat transfer is made possible by the use of a high magnetic field and an essentially zero magnetic field. The paramagnetic material is run back and forth between two temperature extremes. The two temperature extremes are represented by the paramagnetic material in the magnetbore at a temperature, say $T_H$, and the temperature when the paramagnetic material is outside the magnetbore, say a temperature called $T_C$.

$T_C$ is at a temperature lower than a maser, for example. My low temperature helium gas is passed through the housing of the maser. The temperature of the helium gas at $T_C$ allows heat to be drawn from the maser into the helium gas. Since that helium gas is then transferred through the cooler paramagnetic material, I have cooled down the heat source slightly by driving that heat via the helium gas into the cooler matrix.

When this matrix receives the slightly heated gas, the matrix increases in temperature slightly to some nominal amount, say $T_{C1}$. Next my displacer moves this matrix into the magnetic field such that it has gone through a large temperature change $\Delta T$ again. At this time the matrix also has that extra small temperature rise that it received at the cold end. That is, it will also contain the heat energy that was removed from the heat source.

As the matrix is moved to the center of the magnet-bore it will have been heated by the magnetic field to a temperature slightly higher than the temperature of my cooler, which I have chosen in my invention to be designated $T_H$. The helium gas at temperature $T_H$ in the warm temperature loop passes through the warm matrix, cooling the matrix slightly as it removes heat energy from the matrix. The gas then passes through the cooler, wherein the cooler absorbs some of the heat, and thus the helium gas exits the cooler again at a temperature $T_H$. I therefore take heat out of the matrix via the helium gas and dump it into my cooler.

At this point I now return that warmer matrix back to my essentially zero magnetic field where it is at a colder temperature $T_C$. It cools down again to a temperature lower than that of my maser. Therefore, as that cool helium gas is pumped through the maser it will again accept heat from the maser and continuously keep my maser at the predetermined temperature.

As depicted in FIG. 4, a motor was utilized with a rotational-to-linear converter to drive my displacer 11 back and forth through the continuous cycles I have described. Since my invention had at its objective a continuous operation, I avoid stopping my displacer at the end of either stroke. In working toward the preferred embodiment of my invention, I discovered that a particular arrangement of the paramagnetic matrices separated apart from one another on the single magnetic displacer greatly reduced the amount of force necessary to move the displacer through the center of the magnet-bore.

I discovered what I have described as a force compensation method of driving the displacer. In accordance with my force compensation technique, I symmetrically locate the paramagnetic materials which I have depicted simplistically in FIG. 7B as simply GGG on opposite sides of a central location 45, FIG. 3, which originally had a width slightly greater than the height of my magnet. This technique gave me a starting point to determine the amount of force I needed to place a matrix into the center of the magnetbore. An equal but opposite force had to be exerted on the displacer to move the centered matrix out of the center of the magnet and move the other matrix into the center of the magnet.

Those of ordinary skill in the art are directed to two separate articles which related to experiments involving magnetic interaction forces in refrigerator systems of a design clearly distinguishable from my invention. One article is entitled "Double Acting Reciprocating Magnetic Refrigerator: first experiments" by C. Delpuech et al., pages 479 through 584 in *Cryogenics*, October 1981. The second article is a paper, HB6, which was presented at CEC 81, San Deigo, Calif. and was subsequently published in Volume 27, Plenum Press, pages 703-710. The paper is entitled "A Gadolinium Gallium Garnet Double Acting Reciprocating Magnetic Refrigerator" by A. F. Lacaze et al. In these prior art publications two superconducting coils were employed and the paramagnetic substances were cooled by physically immersing them in a bath of liquid helium that was kept at a warmer temperature of 4.2 K. and the cold source was a super fluid bath maintained at about 1.8 K.

FIG. 7A shows by the dotted curve an axial magnetic field profile of my magnet 10 without the additional magnetically soft Hiperco material 14. The magnet creates a 7 tesla maximum field in the center of the magnet. Toward the edges of the magnet, it drops off, as shown by the Gaussian shape of the dotted magnetic profile.

In FIG. 7A the solid line depicts the magnet 10 encased with my magnetically soft Hiperco material 14. The solid line depicts the axial magnetic field dropping off much more quickly. I have thus created a steeper slope, i.e., a larger gradient, in the magnetic field profile. The amount of force (in Newtons) required to move the matrix from outside the magnet to the center of the magnet is roughly proportional to the magnitude of the field gradient averaged over the volume of the matrix. FIG. 7C shows a typical magnetic force measurement in absolute terms.

My first test showed that I needed roughly 350 pounds of force to remove a single 160-gram GGG matrix from the center of the 7-tesla field of my magnet. With two matrices placed in tandem in the displacer, as one paramagnetic matrix is forced out of the magnetic field, the other paramagnetic matrix is drawn into the attractive magnetic field. Relying on this force symmetry the initial tests showed that the amount of force required to move the two-matrix displacer through the 7-tesla field was around 200 pounds.

FIG. 7B shows the extreme right position of the displacer with respect to the magnet displacer is moving toward the left. The magnetic force attracts each GGG matrix to the center of the magnet. However, the GGG matrix in the displacer that is closer toward the center of the magnet is the one that will feel the greater attraction. The net force on the displacer as shown in FIG. 7B will thus act to push the displacer toward the right. When the displacer is moved to the left such that its center is to the left of the magnet center, the matrix on the right will feel the greater attraction. The net force will then push the displacer to the left, whereas the GGG matrix on the right is being drawn into the magnetic field. As the GGG matrix on the right is being drawn into the magnetic field, I require a force to hold it back.

Accordingly, both a pushing force and then a pulling force is needed to overcome this magnetic force so as to move the displacer through a single stroke. The relative positioning of the two GGG matrices and the symmetry they have on the displacer with respect to the center of the magnet are critical in providing the force compensation needed to minimize the overall force required to move the displacer.

All of FIG. 7 is drawn with reference to a common scale. As one can see, the magnet itself (excluding the Hiperco) is approximately 10 centimeters in height. The distance between the closest edges of the two GGG matrices is approximately $8\frac{1}{2}$ centimeters. By using the relatively smaller distance I was able to symmetrically have one matrix leaving the magnetic field as the other matrix was entering the magnetic field. This symmetrical arrangement provided a force compensating feature which I have used to advantage in my invention.

I noticed that small differences in the space of separation between the matrices created substantial changes in the amount of force required to move them into and out of the center of the magnetic field. I moved the matrices closer together by approximately 4/10 inch and the amount of force required to move the displacer dropped down to about 100 pounds. This reduced the length of the stroke required to move the matrix from the maximum to minimum field extremes. More judicious placement of the matrices would reduce this force even further.

One skilled in the art will recognize that the exact amount of separation will vary in accordance with the localized profile of the magnetic field. In my case I found that reducing the separation of the centers of the two matrices to a distance just slightly larger than the height of the magnet itself created a large reduction in force.

The above description presents the best mode contemplated in carrying out my invention. My invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A method of operating a magnetic refrigerator having an object to be cooled at one temperature extreme in heat transfer relationship to a fluid medium, a heat sink adapted for heat transfer with a fluid medium at a second and higher temperature extreme, and a magnetic coil for producing a localized magnetic field, the method comprising the steps of:
   coaxially aligning at least a pair of spaced paramagnetic substances on a movable displacer;
   warming one of the paramagnetic substances by placing it in a constantly energized magnetic field while cooling the other paramagnetic substance to a lower temperature than the first by locating it outside the localized magnetic field; and
   simultaneously flowing two separate fluid medium streams through both of the paramagnetic substances for achieving a heat exchange at both of said temperature extremes.

2. The method in accordance with claim 1 and comprising the additional step of:
   slidably displacing the displacer in a cylinder for a full cycle of movement therein;
   reversing the direction of flow of both of the fluid medium streams once per cycle;
   separating the first and second paramagnetic substances by a center portion of the displacer itself; and
   sealably engaging the center portion of the displacer so that it blocks the flow of the fluid medium during a portion of each stroke in a cycle of movement of the displacer.

3. The method in accordance with claim 1 wherein the paramagnetic substances are porous material, and comprising the additional steps of:
   containably housing a porous quantity of paramagnetic material in hollowed out ends of the displacer; and
   completing flow paths for the fluid medium streams through the porous paramagnetic material housed in the ends of the displacer.

4. The method in accordance with claim 3 wherein the fluid medium is helium gas and comprising the additional steps of:
   pumping helium gas in one gas flow loop which includes the cooler paramagnetic material;
   placing the object to be cooled in a heat exchange relationship with the cooler gas flow loop;
   pumping a separate amount of helium gas in a second and separate gas flow loop which includes the warmer paramagnetic material; and
   placing the heat sink in a heat exchange relationship with the warmer gas flow loop.

5. The method of claim 1 wherein the step of simultaneously achieving a heat exchange at both of said temperature extremes comprises the additional steps of:
   pumping a first fluid medium stream twice per cycle of movement of the displacer through the cooler one of the paramagnetic substances when the cooler one is located respectively on either side of and outside the magnetic field; and
   pumping a second fluid medium stream twice per cycle of movement of the displacer through the warmer paramagnetic substance when either one of said paramagnetic substances are located in and warmed by the magnetic field.

6. The method in accordance with claim 6 wherein the paramagnetic substance is a material that is porous to a gas flow, and the medium fluid is helium gas, said method further including the steps of:
   slidably encasing the displacer in a closed cylinder having a series of ports located therein;
   completing a first helium gas flow loop through ports in the cylinder that are located at opposite ends of the cylinder;
   displacing the displacer so that at least one of the pair of paramagnetic material is outside the magnetic field and in said first helium gas flow loop; and
   flowing the helium gas in said first loop through an empty area within the cylinder which is outside of the magnetic field.

7. The method in accordance with claim 6 and comprising the additional steps of:
   completing a second helium gas flow loop through ports in the cylinder that are located substantially in the center of the cylinder and are positioned in the magnetic field;
   dividing each end of the displacer which houses the paramagnetic substance into a pair of indented gas flow chambers per end;
   separating the two chambers by a raised collar to impede gas flow movement between the inside of the cylinder and the raised collar; and
   locating apertures of sufficient size in the indented portions of each gas flow chamber to readily permit gas flow from the ports through the paramagnetic substance.

8. A method in accordance with claim 1 and comprising the additional step of:
   continuously moving the displacer to alternatively warm and cool each one of the paramagnetic substances.

9. A method in accordance with claim 2 and further comprising the additional steps of:
   reducing the displacer driving force by spacing the first and second paramagnetic substances at a width relative to the magnetic field such that the magnetic attraction of both paramagnetic substances essentially cancel each other.

10. A magnetic refrigerator having an object to be cooled at one temperature extreme in heat transfer relationship to a fluid medium, a heat sink adapted for heat transfer with a fluid medium at a second and higher temperature extreme, and a closed cylinder having communication ports for establishing fluid medium flow paths, said refrigerator comprising:
   at least a pair of spaced porous paramagnetic substances coaxially aligned on a slidably displaceable displacer located within said closed cylinder;
   a magnetic coil surrounding the center portion of said cylinder for producing a constantly-energized localized magnetic field;
   means sliding the displacer into the magnetic field for warming one of the paramagnetic substances, while simultaneously cooling the other paramagnetic substance to a lower temperature than the first by locating it outside the magnetic field; and
   means simultaneously pumping two separate fluid medium streams through both of the porous paramagnetic materials for creating a heat exchange condition at both of said temperature extremes.

11. A refrigerator in accordance with claim 10 and further comprising:
   means for containably housing a porous quantity of paramagnetic material in hollowed out ends of the displacer; and
   ventilating means located in each housing end of the displacer for completing flow paths for the fluid medium streams through the paramagnetic material housed in both ends of the displacer.

12. The magnetic refrigerator in accordance with claim 11 wherein the fluid medium is helium gas and further comprising:
   first means for pumping helium gas in one gas flow loop which includes the cooler paramagnetic material;
   a source to be cooled connected in heat exchange relationship with said first and cooler gas flow loop;
   second means for pumping a separate amount of helium gas in a second separated closed gas flow loop which includes the warmer paramagnetic material; and
   a heat sink connected in a heat exchange relationship with said second and warmer gas flow loop.

13. The magnetic refrigerator of claim 12 wherein the means for simultaneously achieving a heat exchange at both of said temperature extremes further comprises:
   first means for pumping a first fluid medium stream twice per cycle of movement of the displacer when the cooler one of the paramagnetic materials is located respectively on either side of and outside the magnetic field; and
   second means for pumping a second fluid medium stream twice per cycle of movement of the displacer when either one of the paramagnetic materials is located in the magnetic field.

14. A magnetic refrigerator in accordance with claim 13 wherein the porous paramagnetic material is a finely ground substance and the medium fluid is helium gas, said refrigerator further comprising:
   a series of ports located in said closed cylinder;
   means completing a first helium gas flow loop through ports in the cylinder that are located at opposite ends of the cylinder; and
   said means for displacing the displacer is operative to place one paramagnetic material outside the magnetic field and in said first gas flow loop, said first gas flow loop comprising an empty area within the cylinder which is outside of the magnetic field and which is not occupied by the displacer when said displacer is located at either end of said cylinder.

15. A magnetic refrigerator in accordance with claim 14 and further comprising:
   means completing a second gas flow loop through ports in the cylinder that are located substantially in the center of the cylinder and are positioned in the magnetic field;
   means dividing each end of the displacer which houses the paramagnetic material into a pair of indented gas flow chambers per end;
   a plurality of aperture means sufficiently sized for readily permitting gas flow through the indented portions of each gas flow chamber and the paramagnetic material housed therein; and
   means separating the two chambers and sealably engaging with the inside of said cylinder for isolating the two gas flow loops from each other.

16. A magnetic refrigerator in accordance with claim 15 and further comprising:
   means offsetting a pair of gas ports at the center portion of the cylinder and spaced on either side of an opposing port in the cylinder for flowing gas in either direction through the opposing port and at least one of the offset ports.

17. A magnetic refrigerator in accordance with claim 10 and further comprising:
   means for cyclically and continuously driving said displacer.

18. A magnetic refrigerator in accordance with claim 16 wherein said first and second pumping means further comprise:
   first and second bidirectional pumps, one each for driving said separate fluid medium streams.

* * * * *